(12) United States Patent
Loen

(10) Patent No.: US 6,983,549 B2
(45) Date of Patent: Jan. 10, 2006

(54) METHOD TO ACCURATELY MEASURE SMALL ANGULAR DIFFERENCES BETWEEN SURFACES

(76) Inventor: Mark Vincent Loen, 509 Lauretta Dr., Steubenville, OH (US) 43952

( * ) Notice: Subject to any disclaimer, the term of this patent is extended or adjusted under 35 U.S.C. 154(b) by 3 days.

(21) Appl. No.: 10/802,338

(22) Filed: Mar. 18, 2004

(65) Prior Publication Data

US 2004/0239917 A1 Dec. 2, 2004

Related U.S. Application Data

(60) Provisional application No. 60/474,799, filed on Jun. 2, 2003.

(51) Int. Cl.
*G01B 5/24* (2006.01)
(52) U.S. Cl. ............... 33/657; 33/645; 33/412; 33/1 N
(58) Field of Classification Search ............... 33/1 N, 33/1 BB, 613, 645, 701, 228, 281, 282, 285, 33/286, 288, 533, 534, 832, 833, 193, 412, 33/529, 618, 700, 657
See application file for complete search history.

(56) References Cited

U.S. PATENT DOCUMENTS

| | | | | |
|---|---|---|---|---|
| 793,027 A | * | 6/1905 | Burton | 33/657 |
| 898,349 A | * | 9/1908 | Fielding | 33/657 |
| 2,050,725 A | * | 8/1936 | Messinger | 33/657 |
| 2,054,530 A | * | 9/1936 | Williams | 33/657 |
| 2,656,607 A | * | 10/1953 | Harding | 33/412 |
| 3,604,121 A | * | 9/1971 | Hull | 33/657 |
| 3,662,472 A | * | 5/1972 | Johnson | 33/618 |
| 3,947,970 A | | 4/1976 | Lesure | |
| 4,516,328 A | * | 5/1985 | Massey | 33/645 |
| 4,553,335 A | * | 11/1985 | Woyton | 33/645 |
| 4,573,274 A | * | 3/1986 | Albert | 33/657 |
| 4,586,264 A | * | 5/1986 | Zatezalo | 33/412 |
| 4,928,401 A | * | 5/1990 | Murray, Jr. | 33/645 |
| 4,958,439 A | * | 9/1990 | Dehn | 33/608 |
| 5,072,525 A | * | 12/1991 | Philpot et al. | 33/618 |
| 5,075,980 A | * | 12/1991 | Kerman | 33/618 |
| 5,193,288 A | * | 3/1993 | Stifnell | 33/608 |
| 5,279,139 A | * | 1/1994 | Sturm | 72/13.4 |
| 5,425,280 A | * | 6/1995 | Powers | 73/865.9 |
| 5,430,539 A | * | 7/1995 | Lysen | 356/152.1 |
| 5,435,073 A | * | 7/1995 | Sullivan | 33/661 |
| 5,479,718 A | * | 1/1996 | Cook | 33/412 |
| 5,579,585 A | | 12/1996 | Schaeffer | |
| 5,864,962 A | * | 2/1999 | Golinelli | 33/572 |
| 6,493,956 B1 | * | 12/2002 | Matsuda | 33/502 |
| 6,591,218 B1 | * | 7/2003 | Lysen | 702/151 |
| 6,628,378 B1 | * | 9/2003 | Marangoni et al. | 356/150 |
| 6,763,597 B2 | * | 7/2004 | Lysen | 33/286 |
| 6,889,441 B2 | * | 5/2005 | Seiffert | 33/286 |
| 2001/0020335 A1 | * | 9/2001 | Busch | 33/645 |
| 2004/0139621 A1 | * | 7/2004 | Lysen | 33/412 |

* cited by examiner

Primary Examiner—R. Alexander Smith

(57) ABSTRACT

A device and method is disclosed that measures the angular orientation of one surface to another. The device consists of two frames with defined measuring points. The relative distances between the points are measured and then used to determine the angular orientation of the surfaces relative to each other. The measuring method is adapted for the accurate measurement of very small angular differences. The frames can be adapted to measure the angular orientation of many surfaces that are otherwise difficult to measure. The device is particularly suited to measuring small parallel angular differences between two rolls.

9 Claims, 7 Drawing Sheets

METHOD TO ACCURATELY MEASURE SMALL ANGULAR DIFFERENCES BETWEEN SURFACES

RELATED APPLICATIONS

This application claims the benefit of U.S. Provisional Patent Application Ser. No. 60/474,799 filed on Jun. 2, 2003.

STATEMENT REGARDING FEDERALLY SPONSORED RESEARCH OR DEVELOPMENT

Not Applicable.

REFERENCE TO SEQUENCE LISTING, A TABLE, OR COMPUTER PROGRAM LISTING

Not Applicable.

BACKGROUND OF THE INVENTION

1. Field of the Invention

The present invention is generally directed to measuring small relative angular orientation differences between two surfaces; such as roll bodies or other equipment surfaces.

2. Discussion of the Prior Art

A. Roll Parallel Measurement

The most common small angle parallel measuring method involves using surveyor instruments to measure the position of a roll against a nearby offset reference line. A survey transit, for example, is adjusted to be parallel to a reference line and the reference line is perpendicular to the roll to be measured. The transit is then rotated exactly 90 degrees giving a line of sight that is approximately parallel to the roll. A ruler is placed on each end of the roll and the transit line of sight is used to read the crosshair position at each ruler position. The difference in readings indicates if the roll is perpendicular to the offset reference line. The measurement of roll to roll parallel is performed by measuring each roll separately against the same offset reference line. The survey transit may need to be relocated for each roll to be measured. Optical tooling may be used instead of survey instruments for higher accuracy.

The accuracy of this method has been improved by using lasers and electronic measurements of the laser position instead of a visual line of sight and rulers. However, the improved equipment is relatively expensive and requires specialized training. It can also be time consuming to obtain the desired measurement when the roll is in an awkward position or hidden behind obstructions requiring the need for specialized equipment setups and fixtures.

In U.S. Pat. No. 3,947,970 Lesure describes a roll alignment gauge that is useful for roll alignment when one roll is directly above another roll. The device is essentially a vertical level that is adapted to measuring roll to roll twist with a micrometer. In U.S. Pat. No. 5,579,585 Schaeffer describes a device that projects a vertical and horizontal axis of a roll surface to determine alignment to an offset line, but surveyor methods and equipment are still required to actually measure the roll orientation.

B. Other Surfaces—Parallel Measurement

The use of survey methods, previously mentioned, is also applicable to a range of equipment surfaces and various kinds of machinery. The measuring methods for checking machinery surfaces for parallel orientation are essentially the same. The use of laser beams and electronic laser beam detectors are particularly suited to measuring the relative alignment of various surfaces and edges to a very high accuracy.

The use of inside micrometers to measure the parallel alignment between two surfaces is also a common way to measure small differences parallel orientation. This is useful when the measuring surfaces are readily available, correctly oriented to each other, closely spaced, and there is no obstructing equipment. However, in actual practice, the measuring surfaces may not be conveniently disposed to each other to facilitate such measurement. The surfaces to be checked may not be two parallel planes correctly oriented to each other, which is troublesome to measure accurately with standard measuring equipment. The surfaces may be a significant distance apart, beyond the measuring range of commonly available instruments. The surfaces may be rounded, making it particularly difficult to measure parallel orientation.

BRIEF SUMMARY OF THE INVENTION

Accordingly, it is the object of this invention to provide convenient, direct, and accurate measurement of small orientation angles between two surfaces free of the use of surveyor methods. The orientation is measured in a two dimensional plane. Other objects, advantages, and contributions are set forth in the disclosing embodiments of the invention.

DETAILED DESCRIPTION OF THE INVENTION

Figure 1:
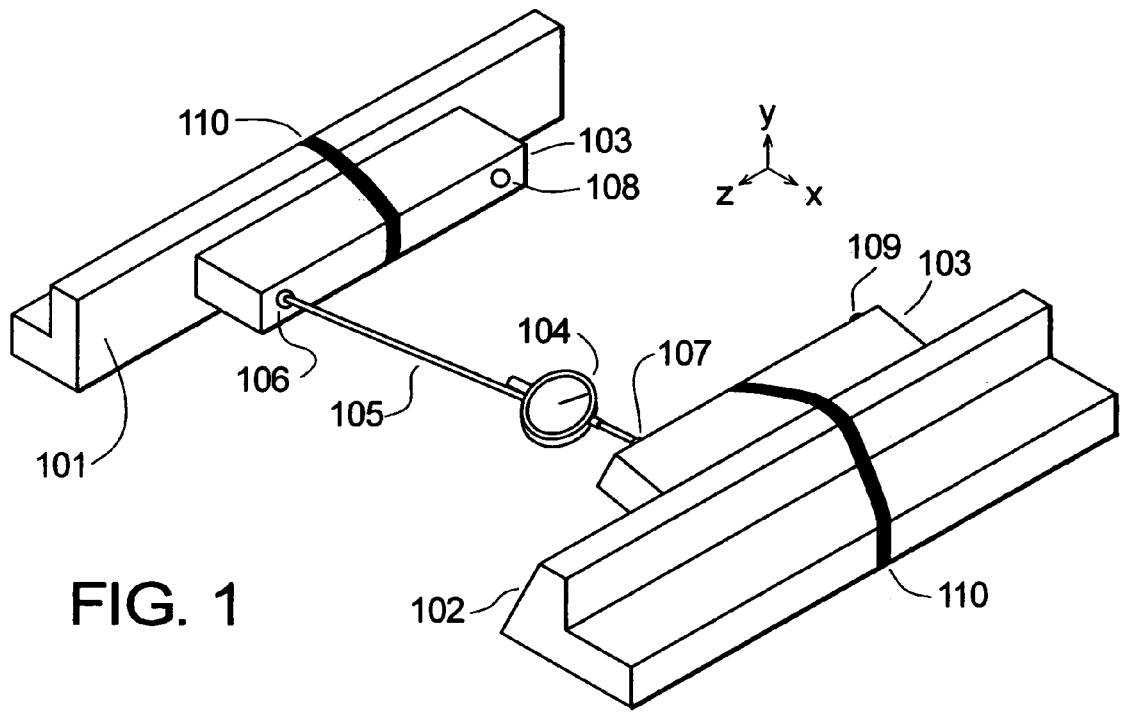
FIG. 1 shows a preferred embodiment where spherical measuring points are strategically placed on the two frames and a relative distance measurement is performed using a dial indicator on the end of a rigid rod.

In general, the device consists of two precision frames that are attached to the surfaces to be measured. The frames include measuring points that are in a defined and parallel relationship to the surfaces to be measured. The reference points provide accurate and convenient measurement of the relative orientation of the two frames. Common measuring devices are then adapted to measure the relative distance between the points on the two frames. The measuring devices and computational methods are tailored to the calculation and accurate measurement of very small non-parallel orientation angles.

In one preferred embodiment, the device is capable of measuring the non-parallel angle between two flat surfaces. In this case, the device consists of two substantially identical frames that are mounted on the surfaces to be measured. The frames include at least two measuring points parallel to the surfaces. The measuring points are defined by small round spherical sections that are carefully positioned. The spherical sections facilitate accurate measurement of the relative distance between the frames using highly sensitive measuring instruments.

The use of small spherical sections also removes the need for a particular rotational orientation between the two surfaces.

The measuring points can be also be defined by a variety of shapes such as clips, grooves, rings, cups, concave curves, convex curves, holes, hooks, magnets, flat surfaces, triangles, cones, rounded ends on various shapes, and the like.

The frames can be adapted to measuring the non-parallel angle between other surfaces. In another preferred embodiment, the device can be adapted to measuring the non-parallel angle between the surfaces of two rolls. In this case, the device consists of two substantially identical frames that are mounted on the radial surfaces of the two rolls to be measured. A v-groove in the frame aligns the frame to the roll surface.

The calculation method for the parallel orientation angle between the two frames is made considering the relative accuracy of the measurement of each component. One component is a differential distance measurement that can be performed by highly accurate instruments commonly available. Another component is the nominal distance between measuring points that can be measured by ordinary steel tapes.

The differential distance measurements can be made using inside micrometers, scales, calipers, dial indicators, electronic distance measuring devices, and the like. A preferred embodiment is to use a dial indicator attached to the end of an adjustable length rod. Because differential distance measurements are needed to a high accuracy, a dial indicator with a very fine resolution may be employed. A dial indicator with a resolution of 0.001" or better is most preferable. If the two frames are made to accurate machining tolerances, angular orientation measurements less than 0.00005 radians are obtainable.

If a dial indicator is used for the differential distance measurement, the ends of the adjustable length rod and dial indicator rod can be adapted for highly repeatable measurements. Counter-bored ends provided enhanced repeatability and accuracy when using spherical shaped measuring points. The ends can be counter-bored as a straight hole or a cone.

The calculations assume that the measuring points between the two frames are in substantially the same plane. Significant out of plane twist between frames is detrimental to the calculations. Fortunately, it is the normal case for the equipment surfaces to be substantially in the same plane. The allowable out of plane twist varies with the distance between the frames, the symmetry of the twist, the spacing of the measuring points on each frame, and the desired measuring error. However, the out of plane twist should be no worse than 0.1 radians, and preferably less than 0.01 radians for closely spaced frames.

In most cases, equipment surfaces may be checked for level to see if they present potential out of plane twist problems. It may be convenient to add bubble vials to the two frames to provide for level measurement.

In another preferred embodiment, it is possible to measure the differential distances between the two frames using a string, fine chain, or wire under tension. For example, a string can be attached to a highly accurate measuring device that provides a steady tension. The string and measuring device can be moved from one measuring pair of points to another. The difference in distance is thereby determined. A highly accurate measurement is obtained by using a fine measuring instrument, such as a dial indicator, that is attached to the string. Even string tension can be provided by a spring.

The two frames may also be adapted for the accurate measurement of the frame perpendicular angle relative to a reference line defined by the position of the two frames. Three equally spaced measuring points can be placed on each of the two frames in a manner to allow the non-perpendicular angle of the frames relative to a centerline between the two frames to be measured.

Some rolls are manufactured to include a crown. That is, they have a slightly larger diameter in the middle. The non-parallel alignment angle still can be measured accurately provided that any out of plane twist between measuring points is minimized.

When measuring roll parallel orientation, the weight of the frames may cause the roll to rotate which presents difficulties with making accurate measurements. A clamp may be added to each frame so that a stabilizing bar may be used between the two frames to prevent roll rotation during the measurement. If the two frames are installed and strapped to the rolls first, the stabilizing rod can be clamped in a manner that does not change the parallel angle measurement. Counter weights may also be employed to prevent rotation.

In another preferred embodiment, the relative longitudinal position of the two frames can be accurately measured. An additional differential distance measurement between measuring points can be made and the relative longitudinal offset distance between the frames can be calculated very accurately. This measurement is useful when rolls need to be centered to each other on the processing line. The frames can be centered on the rolls and then the horizontal offset measured from one frame to another.

FIG. 1 shows an embodiment of the invention where the measurement of the non-parallel angle is performed by using defined measuring points. The non-parallel alignment angle is to be determined for two flat surfaces 101, 102 where one surface is not perpendicular to the x-z plane. The two duplicate frames 103 are attached to the surfaces 101, 102 with straps 110. A dial indicator 104 is attached to a rigid rod 105 and the measurement of the distance between the two measuring points 106 and 107 is shown. A second measurement is obtained between points 108 and 109. The change in the dial indicator reading (Δd) and the width (W) between points 106 and 108 are used to calculate the non-parallel angle (β) between the two surfaces 101, 102.

$$\beta = \sin^{-1}\left(\frac{\Delta d}{W}\right) \quad (1)$$

The non-parallel angle (β) is measured in the plane defined by the measuring points 106, 107, 108, and 109.

In actual measuring practice, the rigid rod 105 will have a minor amount of droop. For short distance measurements, the droop is negligible. For longer distance measurements, the droop can be significant. Since only the difference in distance is needed, droop is not a problem provided it is consistent between measuring point pairs. This can be controlled by not rotating the measuring rod 105 between measurements. Also, the rod can be made from very stiff materials.

Figure 2:
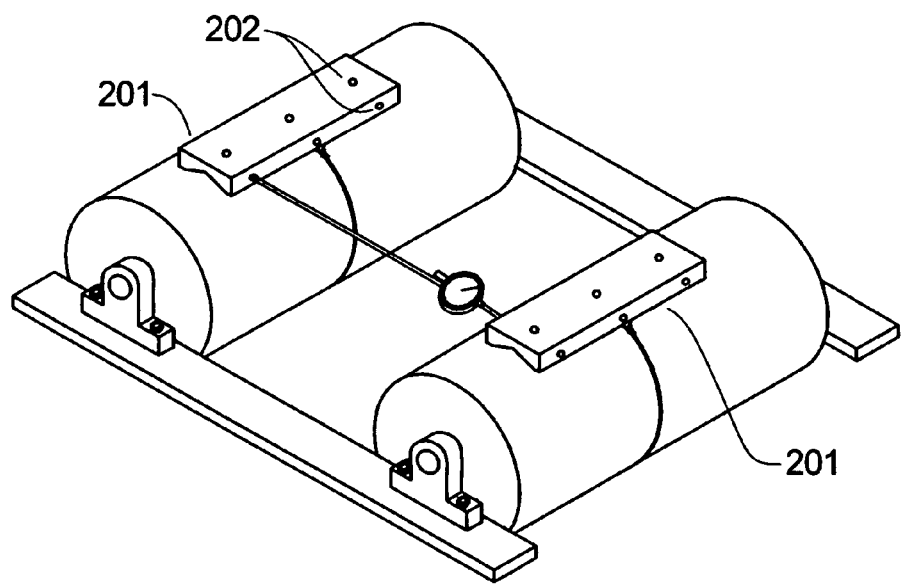
FIG. 2 is another preferred embodiment where the two frames are mounted on the surfaces of two rolls.

FIG. 2 shows the frame arrangement for the non-parallel angle measurement of two rolls. The two frames 201 do not have to be centered on the rolls for equation 1 to be accurate. The frames may be offset along their respective roll central longitudinal axis. In this figure, the frames 201 have three measuring points 202 on three different surfaces. For clarity, only two typical measuring points 202 are indicated. The multiple measuring surfaces allow measurement at different roll rotations.

Figure 3A:
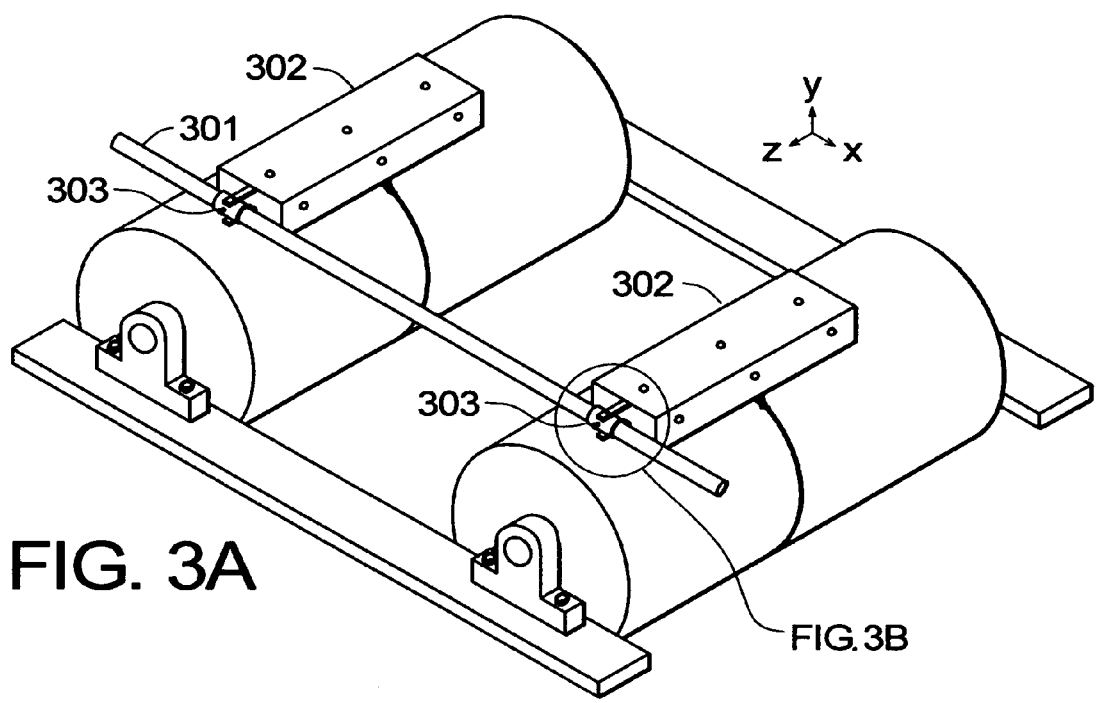
FIGS. 3A and 3B are an enhancement of the device in FIG. 2. A locking rod can be used to stabilize the rotational positions of the two frames relative to each other without influencing the angular orientation measurement.
Figure 3B:
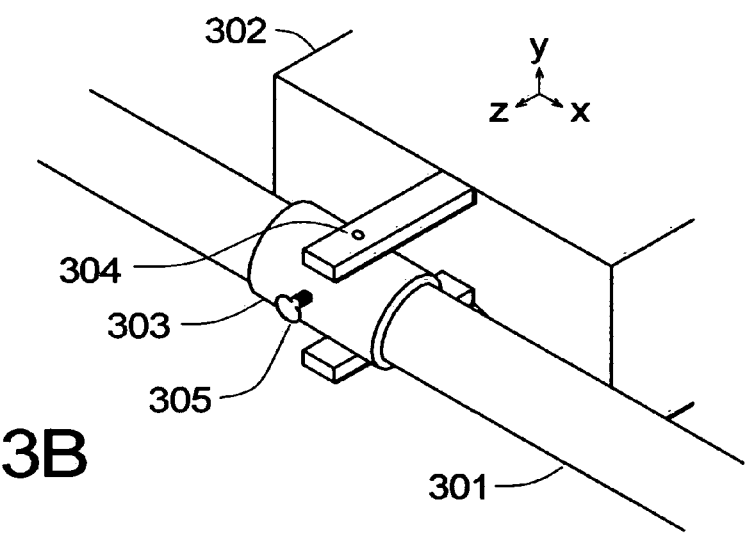

FIG. 3A shows an embodiment of the invention where the rolls need to be stabilized by attaching an anti-rotating stabilizing bar 301 to the end of the frames 302 using a sliding collar 303. The detail view in FIG. 3B shows that the collar 303 is attached to the frame 302 by pins 304 that allow rotation perpendicular to the x-z plane so that the stabilizing bar 301 does not alter the angular position of the frames 302 on the roll surfaces. The stabilizing bar 301 may be allowed to slide freely through the opening in the collar 303 or it may be rigidly attached by locking thumbscrew 305.

Figure 4A:
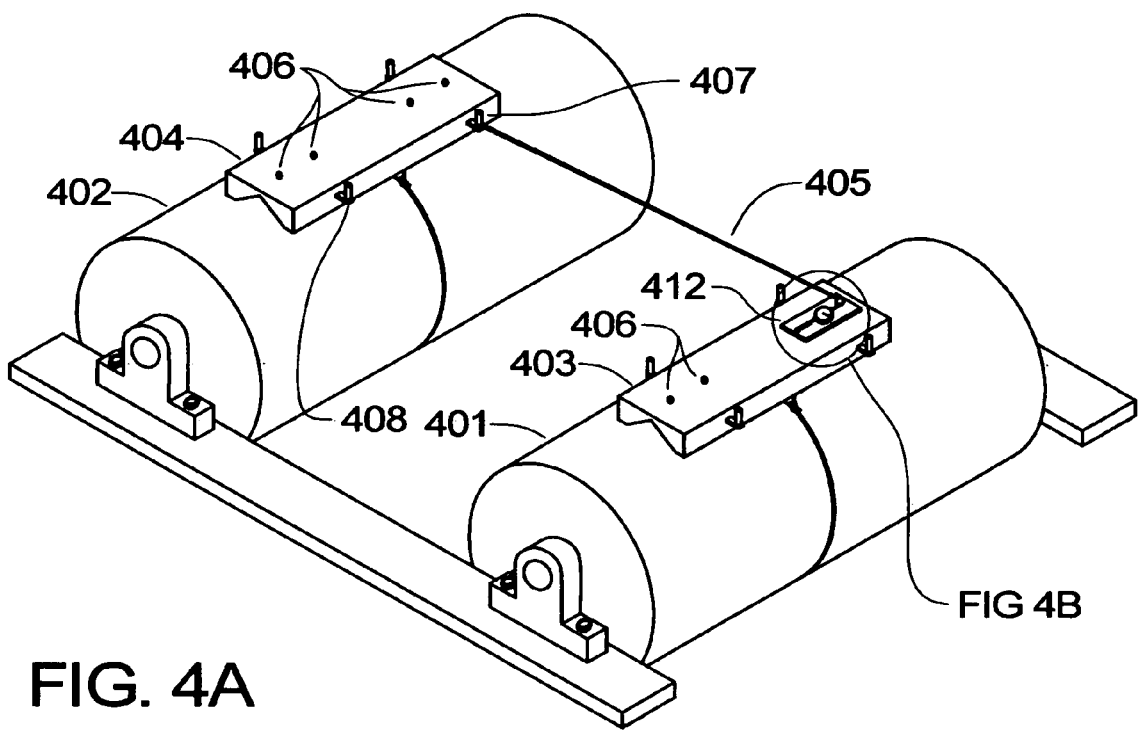
FIGS. 4A and 4B show another embodiment where a relative distance measurement is done with a string attached to a measuring device that provides tension.

FIG. 4A shows an embodiment of the invention where the relative measurement of distance is performed by a change in length of a string 405. Two rolls 401, 402 are shown with duplicate frames 403, 404 and a change in length measuring device mounted on a base plate 412 that can be moved between two positions on frame 403 through mounting holes 406 and positioning pins (not shown) under the base plate 412.

Figure 4B:
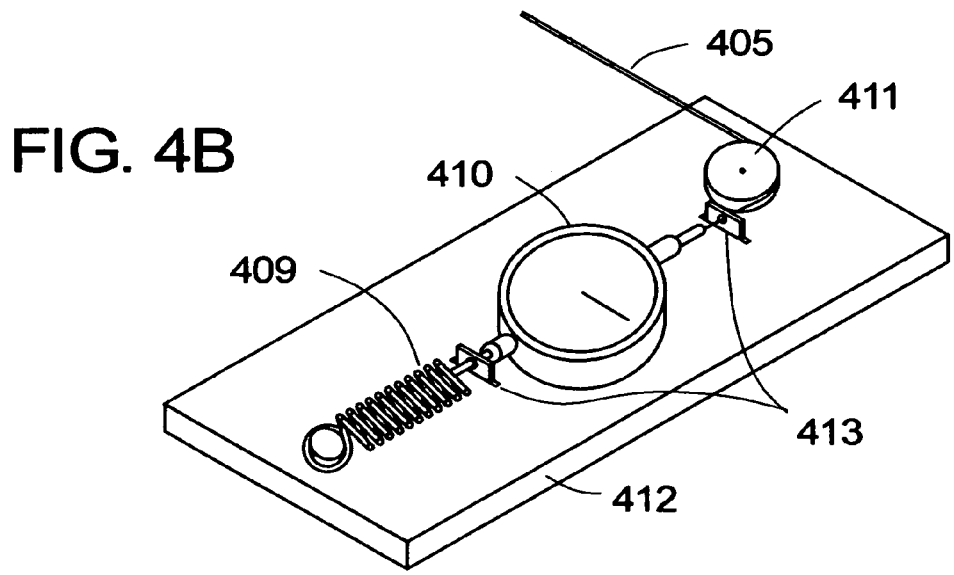

FIG. 4B shows a detail view of a spring 409 that is attached to a dial indicator 410 which provides string tension through the dial indicator measuring rod. A freely rotating pulley wheel 411 redirects the string to the measuring point. The dial indicator 410, spring 409, and pulley wheel 411 are mounted on a base plate 412. Stops 413 are anchored to the base plate 412 to protect the dial indicator from over travel. In FIG. 4A the base plate 412 is temporarily positioned on the frame 403 at one measuring position. To obtain a second reading, the base plate 412 is lifted and moved to a second measuring position on the other end of the same frame 403. The string is also moved to the second measuring position 408 on the other frame 402. An accurate method is needed to attach the string to the measuring points 407, 408 which could also include magnets, clamps, grooves, shapes, clips, and the like. FIG. 4A demonstrates a hook style.

In some equipment alignment situations, the surfaces need to be aligned to a reference line that runs down the center of multiple surfaces. Additional calculations can be used to calculate individual angular orientation to the center of the frames.

Figure 5:
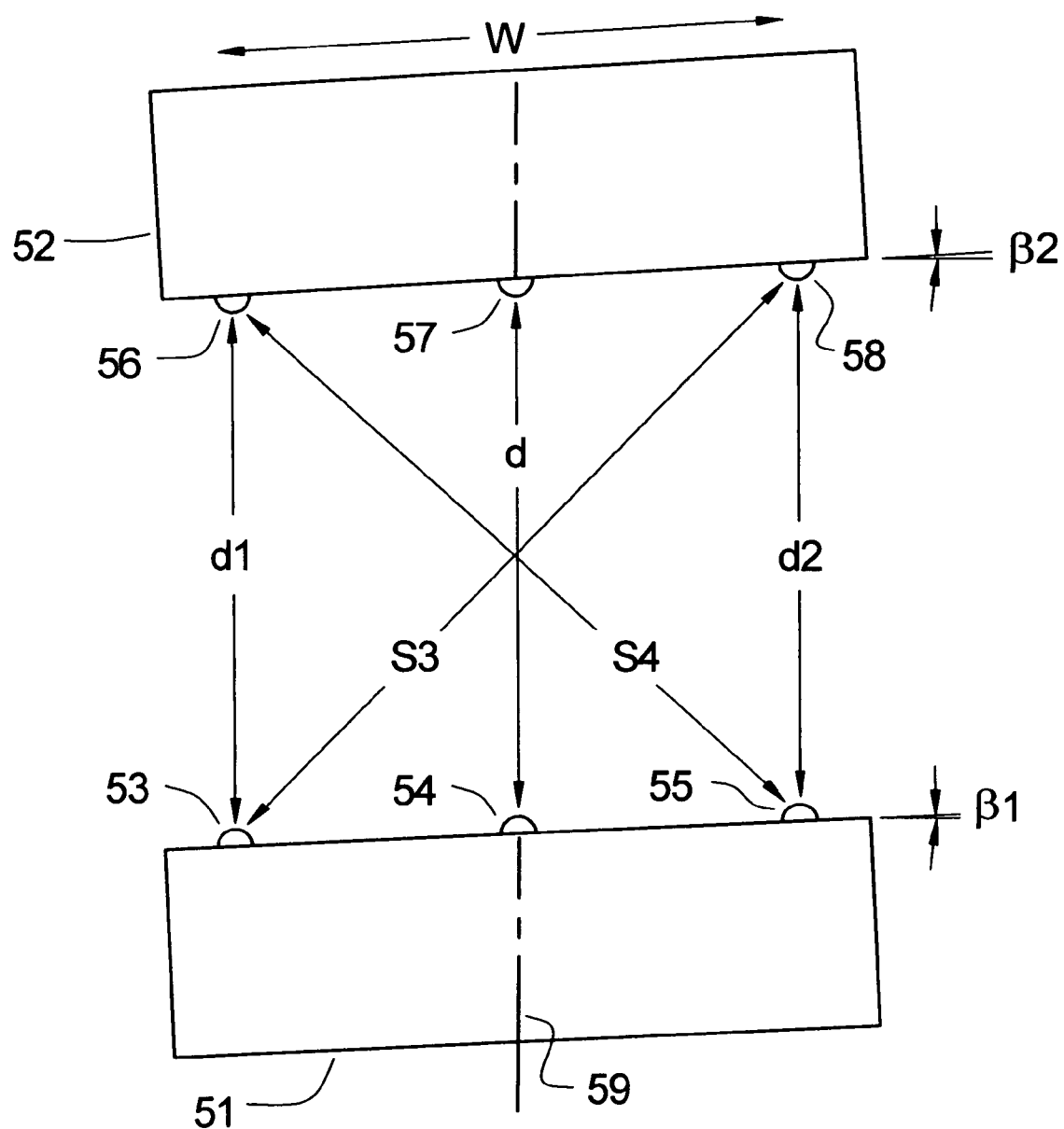
FIG. 5 shows a simplified representation of the two frames demonstrating how the calculation of the angular orientation is performed by measuring the orientation of each frame relative to a reference line.

FIG. 5 shows a simplified top view representation of the two frames 51, 52 that highlights the measuring points 53, 54, 55, 56, 57, and 58. The distances between the measuring point pairs 53–56 (d1), 55–58 (d2), 53–58 (S3), 55–56 (S4), and 54–57 (d) are shown. The reference line 59 goes through points 54 and 57. The calculation of the angles β1 for unit 51 and angle β2 for unit 52 relative to the reference line are:

$$\Delta d = d1 - d2 \quad \Delta S = S3 - S4 \quad (2)$$

$$S = \sqrt{W^2 + d^2} \approx \frac{S3 + S4}{2} \quad d = \frac{d1 + d2}{2}$$

$$\beta 1 = \sin^{-1}\left[\frac{1}{2W}\left(\frac{S(\Delta S)}{d} + \Delta d\right)\right]$$

$$\beta 2 = \sin^{-1}\left[\frac{1}{2W}\left(\frac{S(\Delta S)}{d} - \Delta d\right)\right]$$

where the angles β1 and β2 are positive when rotated clockwise and are the deviation from perpendicular to the reference line. The calculations in equation 2 are accurate when the angles β1 and β2 are less than 5 degrees because small angle assumptions were used. The non-parallel angle between the two surfaces is simply the difference between angles β1 and β2.

Figure 6:
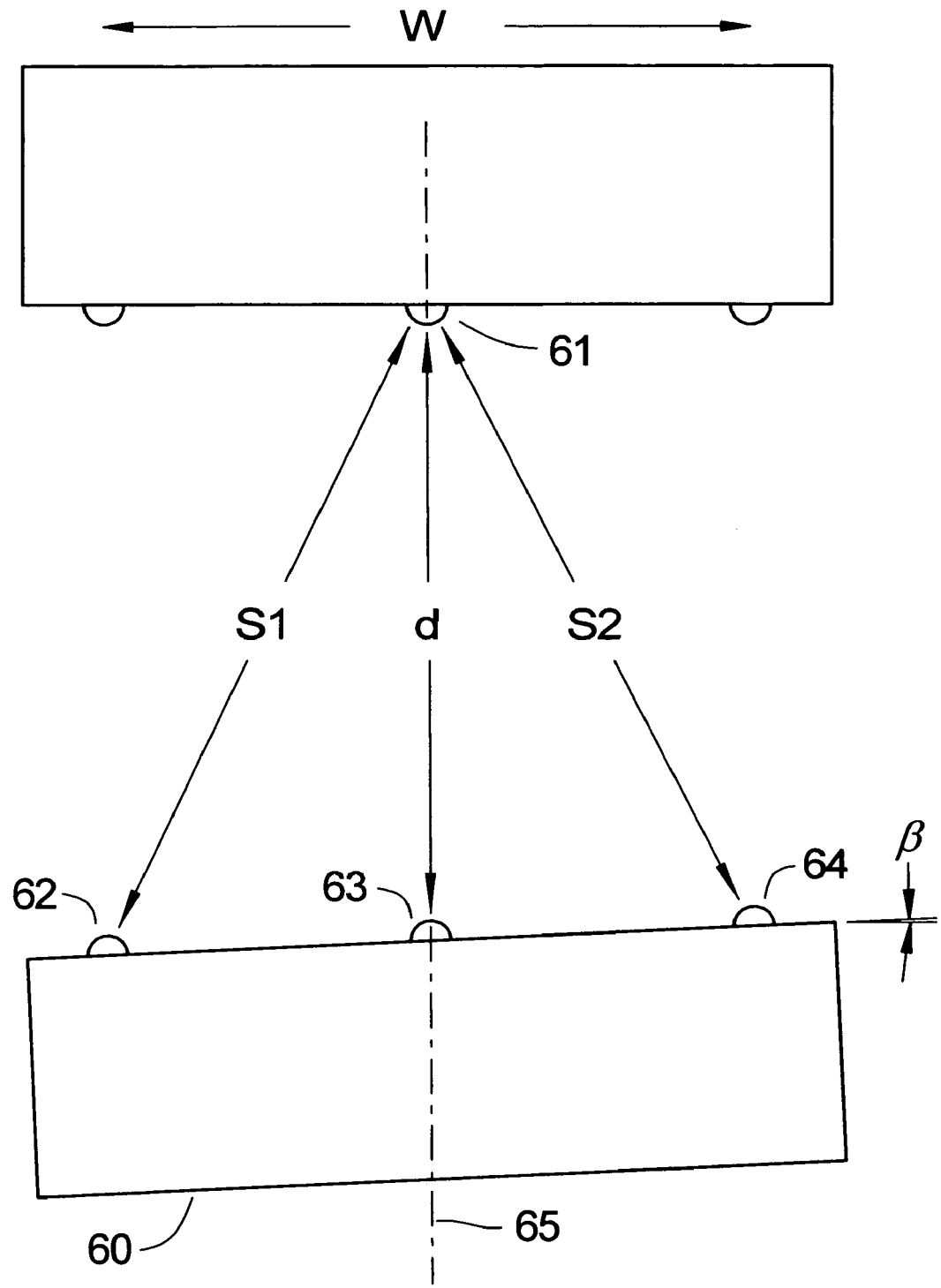
FIG. 6 shows another simplified representation of the two frames demonstrating another method of calculating the angular orientation to a reference line.

FIG. 6 shows a simplified top view representation of two duplicate frames that highlights the measuring points for measuring the non-perpendicular angle β of the frame 60 in reference to a line 65 between points 61 and 63 on the frames. When β is zero, a line between points 62 and 64 is perpendicular to line 65. The distances between the measuring point pairs 61–62 (S1), 61–64 (S2), 62–64 (W), and 61–63 (d) are shown. The non-perpendicular angle β between the two frames is calculated by:

$$S = \sqrt{d^2 + \frac{W^2}{4}} \quad \Delta S = S2 - S1 \quad \beta = \sin^{-1}\left[\frac{S(\Delta S)}{Wd}\right] \quad (3)$$

The dimension ΔS is a change in length and can be measured by the methods already disclosed. Fine resolution of ΔS is required. The dimensions d and W are nominal lengths that can be measured with a steel tape.

Figure 7:
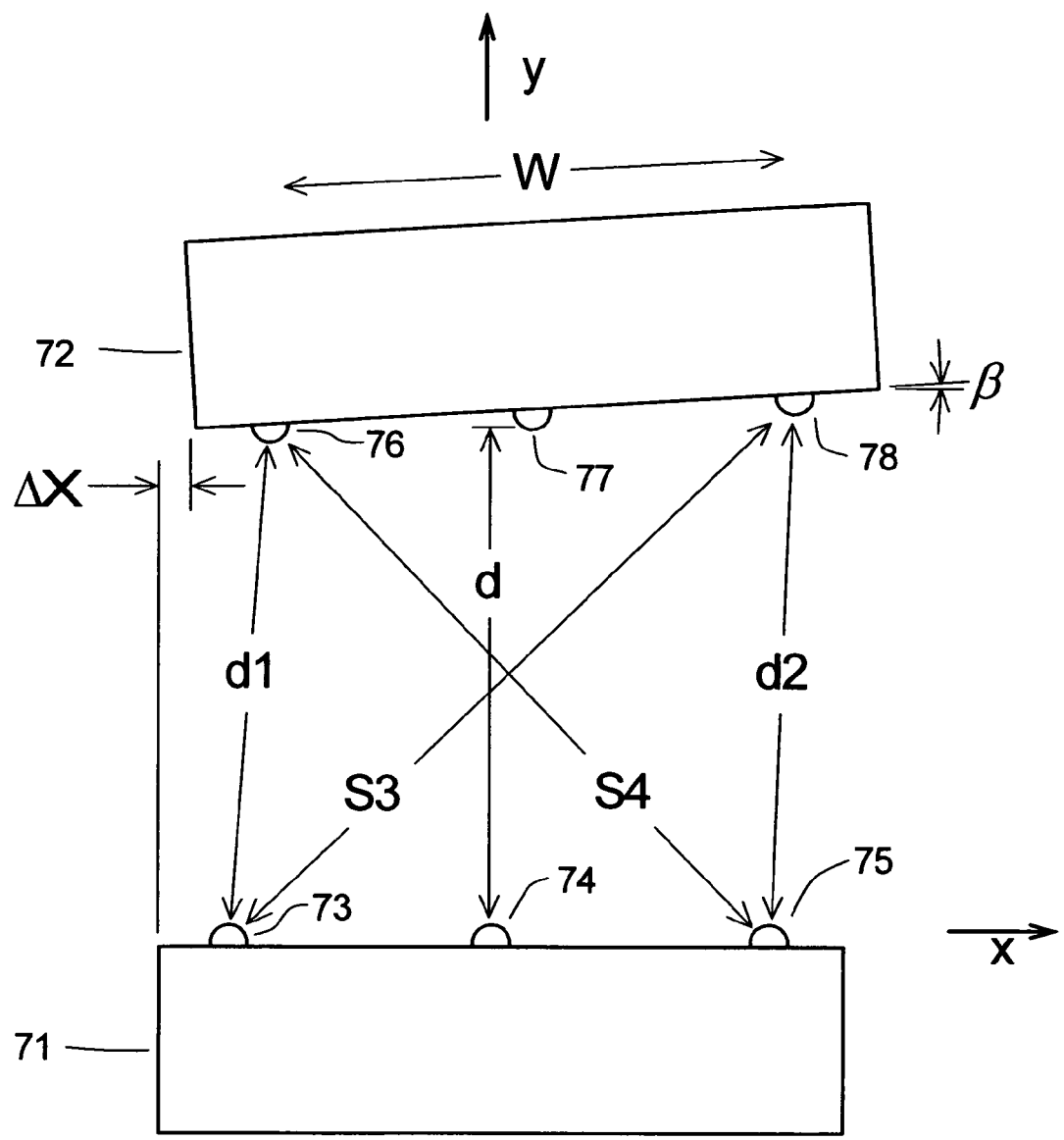
FIG. 7 shows another simplified representation of the two frames demonstrating another calculation of the non-parallel alignment angle and the frame offset distance.

FIG. 7 shows an embodiment of the invention where the measurement of the non-parallel angle β, and the horizontal offset distance ΔX, are obtained by using defined measuring points. Again, the top view is shown of two duplicate frames 71 and 72. The distances between the measuring point pairs 73–76 (d1), 74–77 (d), 75–78 (d2), 73–78 (S3), 75–76 (S4), and 76–78 (W) are shown. The horizontal offset distance ΔX and the non-parallel angle β between frames 71 and 72 can be calculated by:

$$\Delta d = d1 - d2 \quad \beta = \sin^{-1}\left(\frac{\Delta d}{W}\right) \quad (4)$$

$$\Delta S = S3 - S4 \quad \Delta X = \frac{S(\Delta S) + d(\Delta d)}{2W}$$

This series of equations assumes that the offset distance ΔX is small compared to the width W. The non-parallel angle β is measured relative to the line defined by the measuring points 73, 74, and 75.

The determination of ΔX provides for additional understanding of the in plane angular orientation of the surfaces to each other. For example, when is ΔX is not zero, the measuring points define a parallelogram when β=0.

While various embodiments of the present invention have been described, the invention may be modified and adapted to various angular measurements to those skilled in the art.

Therefore, this invention is not limited to the description and figures shown herein, and includes all such changes and modifications that are encompassed by the scope of the claims.

Figure 8A:
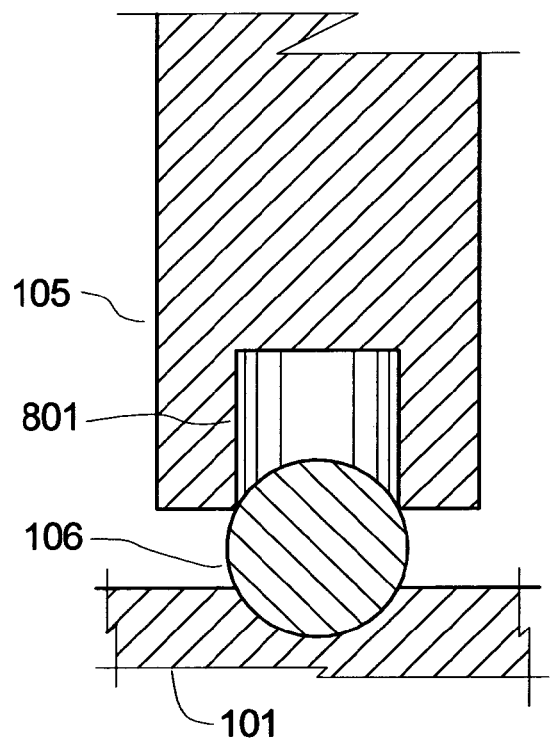
FIGS. 8A and 8B show an embodiment where the length measuring device incorporates a counter bored end.
Figure 8B:
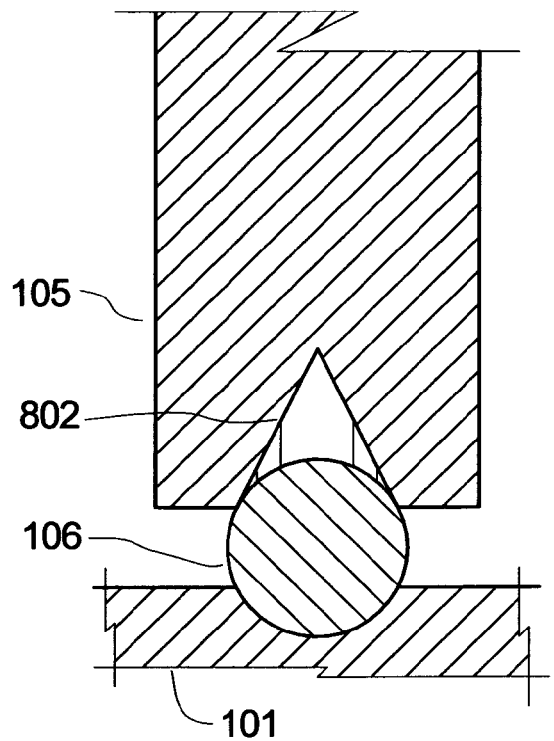

In FIG. 8A, the rigid member 105 end has a cylindrical 801 counter bore for a more precise measurement by touching spherical shape 106 in a highly repeatable manner. In FIG. 8B, the rigid member 105 end has a conical counter bore. In both FIGS 8A and 8B, the spherical shape 106 is firmly attached to frame 101.

I claim:

1. A method to determine the angular orientation between two surfaces using:
   A. a first frame that is aligned to one of said two surfaces, and
   B. a second frame that is aligned to the other of said two surfaces, and
   C. at least two measuring points are defined on said first frame at a known distance apart, and
   D. a line connecting said at least two measuring points on said first frame is aligned parallel with said first surface, and
   E. at least two measuring points are defined on said second frame at the same said known distance apart, and
   F. a line connecting said at least two measuring points on said second frame is aligned parallel with said second surface, and
   G. said at least two measuring points on said first frame and said at least two measuring points on said second frame are approximately in the same plane, and
   H. the positions of said at least two measuring points on said first frame are measured relative to the positions of said at least two measuring points on said second frame by physical contact and by use of a length measuring device,
   whereby said angular orientation between said two surfaces is determined in said plane.

2. The method according to claim 1 where at least one of said relative position measurements is measured by using said length measuring device which is attached to a rigid member.

3. The method according to claim 2 where the length of said rigid member is adjustable.

4. The method according to claim 1 where said two surfaces are the radial surfaces of a roll.

5. The method according to claim 4 where a rigid member is attached to said first frame and said second frame in a manner to prevent rotation of said rolls.

6. The method according to claim 1 where said at least two measuring points on said first frame and said at least two measuring points on said second frame are represented by solid geometric shapes.

7. The method according to claim 6 where said small geometric shapes are sections of a sphere.

8. The method according to claim 7 where the length measuring instrument that measures the relative positions between said sections of a sphere incorporates ends that are counter-bored.

9. A method to determine the angular orientation between two surfaces using:
   A. a first frame that is aligned to one of said two surfaces, and
   B. a second frame that is aligned to the other of said two surfaces, and
   C. at least two measuring points are defined on said first frame at a known distance apart, and
   D. a line connecting said at least two measuring points on said first frame is aligned parallel with said first surface, and
   E. at least two measuring points are defined on said second frame at the same said known distance apart, and
   F. a line connecting said at least two measuring points on said second frame is aligned parallel with said second surface, and
   G. said at least two measuring points on said first frame and said at least two measuring points on said second frame are approximately in the same plane, and
   H. the positions of said at least two measuring points on said first frame are measured relative to the positions of said at least two measuring points on said second frame, and
   I. at least one of said relative position measurements is measured by using the change in length of a string under tension,
   whereby said angular orientation between said two surfaces is determined in said plane.

* * * * *